United States Patent [19]
Reid et al.

[11] 3,800,574
[45] Apr. 2, 1974

[54] SPARE WHEEL LOCK ASSEMBLY
[75] Inventors: Robert V. Reid, Roseville; Charles E. White, Allen Park, both of Mich.
[73] Assignee: Ford Motor Company, Dearborn, Mich.
[22] Filed: Mar. 15, 1973
[21] Appl. No.: 341,648

[52] U.S. Cl. ................................................. 70/231
[51] Int. Cl. .......................................... F16b 41/00
[58] Field of Search ............ 70/221, 231, 232, 259, 70/260, 417

[56] References Cited
UNITED STATES PATENTS
| | | | |
|---|---|---|---|
| 1,515,809 | 11/1924 | Eckenroad | 70/221 |
| 1,629,015 | 5/1927 | Axelson | 70/231 |
| 1,645,917 | 10/1927 | Maszczyk | 70/231 |
| 1,667,986 | 5/1928 | Raleigh | 70/231 |
| 1,858,893 | 5/1932 | Heyer | 70/259 |

Primary Examiner—Albert G. Craig, Jr.
Attorney, Agent, or Firm—John J. Roethel; Keith L. Zerschling

[57] ABSTRACT

A spare wheel lock assembly adapted to be locked or unlocked with a key. The lock assembly functions as a conventional wing nut to hold a spare wheel on a hold-down bolt secured to the floor or a panel of a compartment. When in unlocked condition, the lock assembly can be installed by rotation in threaded engagement with the hold-down bolt. When in locked condition on the hold-down bolt, the lock assembly free wheels about the hold-down bolt without axial movement.

10 Claims, 5 Drawing Figures

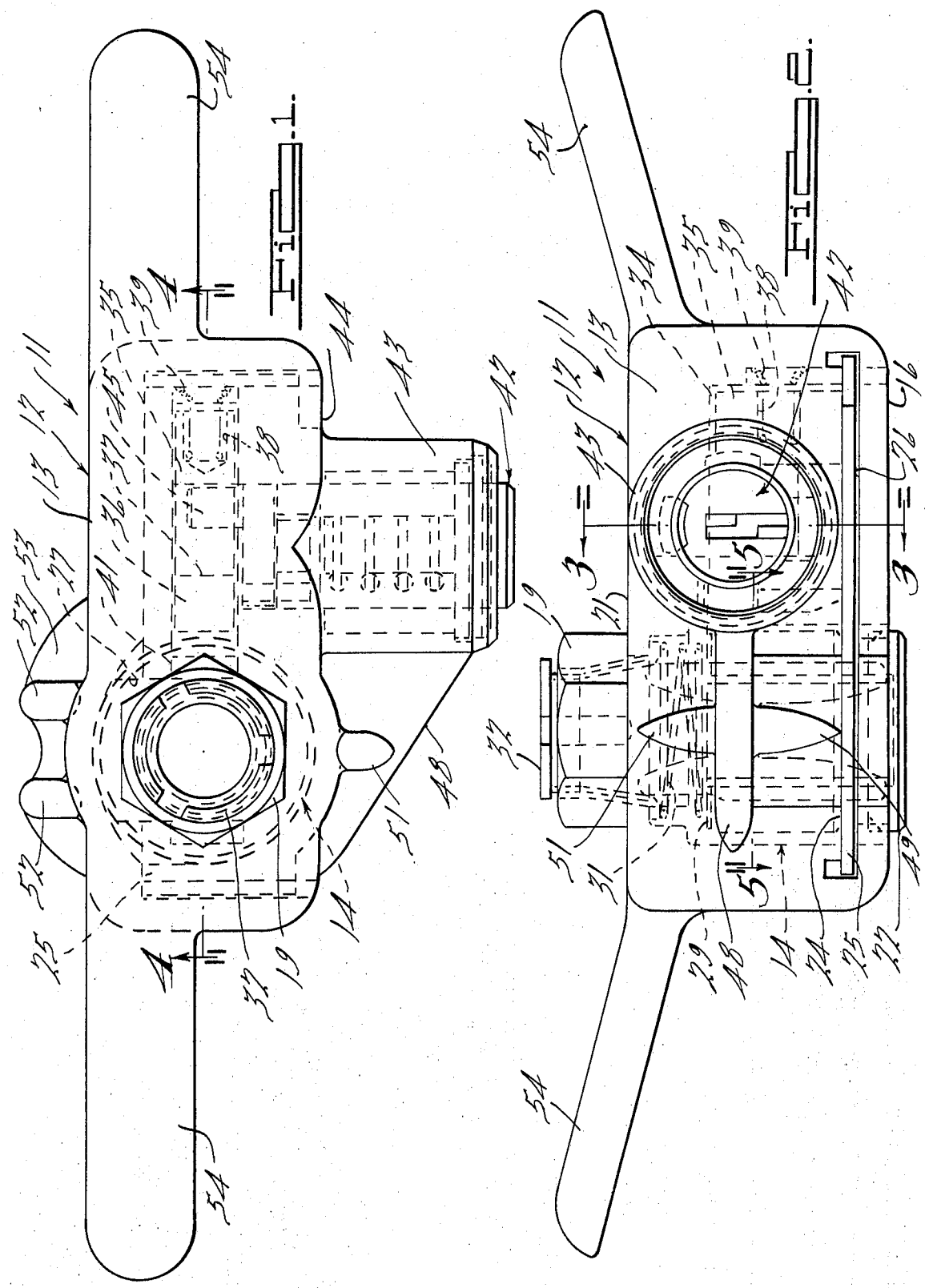

SPARE WHEEL LOCK ASSEMBLY

BACKGROUND OF THE INVENTION

Almost from the time that motor vehicles were equipped with spare wheels, the wheels and the tires mounted thereon have been an attraction to thieves. This was especially so in the days when the spare wheel was mounted on an exposed support or rack on the side or rear of the vehicle. The use of a free wheeling locking device for preventing removal of the spare wheel from the hold-down bolt was a recognized expedient. U.S. Pat. No. 1,516,453 issued Nov. 18, 1924 to G. H. Nichols for a "Theft Preventing Device" disclosed the basic mechanism as comprising "an improved form of nut which may be threaded in place in the usual manner and then set by a key, so that if the body of the nut is rotated in an attempt to remove it, it will merely rotate about a separate, internal, threaded sleeve which engages the bolt, and will not effect removal of the nut from the bolt."

Similar devices were disclosed in U.S. Pat. No. 1,604,690 issued Oct. 26, 1926 to C. E. Halaby for a "Nut Locking Device" and U.S. Pat. No. 1,628,740 issued May 17, 1927 to J. F. Raleigh for a "Locking Device."

Later the spare wheels were moved inside the vehicle luggage compartment for storage and reliance was placed on the luggage compartment lock to protect the spare wheel and tire against theft. In recent years, however, tire thieves have developed much expertise in breaking into luggage compartments and removing the spare wheel. Even if they run into a free wheeling locking device on the wheel hold-down bolt, they are usually equipped with vise grips, slam pullers and other sophisticated tools which permit a rapid destruction of the locking device.

Accordingly, it is an object of the present invention to provide an updated version of a spare wheel lock assembly of the free wheeling type which has features effective to slow down even a thief well equipped with tools in any attempt to steal the spare wheel and tire mounted thereon.

SUMMARY OF THE INVENTION

The present invention relates to a spare wheel lock assembly for preventing removal of a wheel from a hold-down bolt. The lock assembly comprises a housing that has a nut means rotatably mounted therein, the nut means being adapted to threadedly engage the hold-down bolt. A reinforcing plate means carried by the housing is in engagement with the nut to prevent forceable displacement or separation of the housing relative to the nut when the latter is threaded on the hold-down bolt. A key operable bolt means is slidable within the housing for locking the nut means to the housing so that a predetermined twisting force applied to the housing about the axis of the hold-down bolt will rotate and unthread the nut from the bolt. The housing is provided with reinforcing rib means positioned to resist a tool applied force to the housing for crushing the latter and jamming the bolt therein.

DESCRIPTION OF THE DRAWING

Further features and advantages of the present invention will be made more apparent as this description proceeds, reference being had to the accompanying drawings, wherein:

FIG. 1 is a plan view of the spare wheel lock assembly embodying the present invention;

FIG. 2 is a side elevation view;

DESCRIPTION OF THE PREFERRED EMBODIMENT

Figure 3:
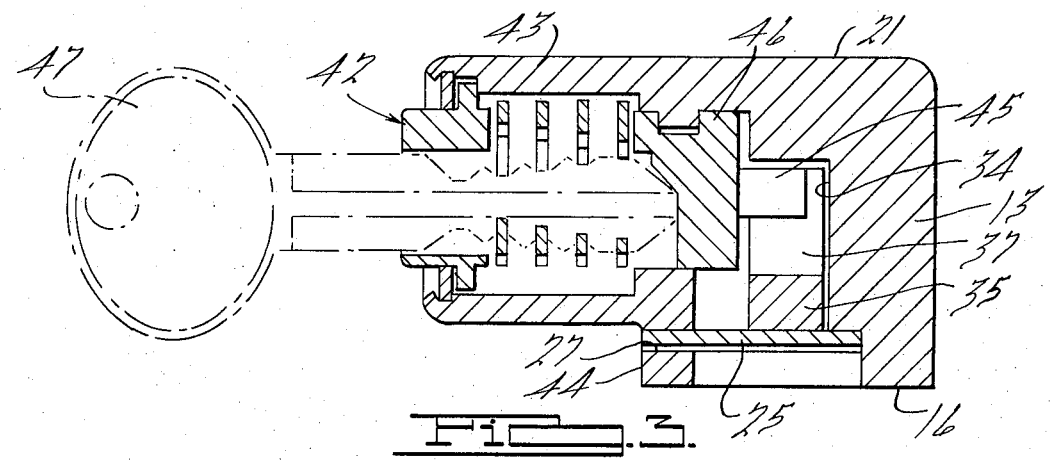
FIG. 3 is a sectional view on the line 3—3 of FIG. 2.

The spare wheel lock assembly, generally designated 11, comprises a die cast metal housing 12 having in plan and side elevation a generally rectangular body portion 13. This body portion 13 at one end has a cylindrical stepped chamber 14. As best seen in cross section in FIG. 4, the chamber 14 has its largest diameter section 15 open to the bottom surface 16 of the body portion 13. Smaller diameter sections 17 and 18 are above the large diameter section 15. The smallest and upper chamber section 18 opens out through a hexagonal nut-shaped appendage 19 projecting above the upper surface 21 of the housing body portion 13.

Housed within the chamber section is a cylindrical nut member 22 having internal threads 23. Near the bottom end the nut member 22 has an external peripheral groove 24. Except as will be described, the nut 22 is freely rotatable within the chamber section 15. The nut 22 is held in the chamber section 15 by an elongated plate 25 which is positioned in an elongated slot 26 in the housing, the plate being inserted laterally into the housing slot 26 after the nut 22 is positioned in the chamber section 15. The plate 25 has a laterally extending slot 27 which fits the base diameter of the nut member groove 24. The plate 25 is held in place by staking of the die cast metal of the housing 12 in a suitable number of places.

Figure 4:
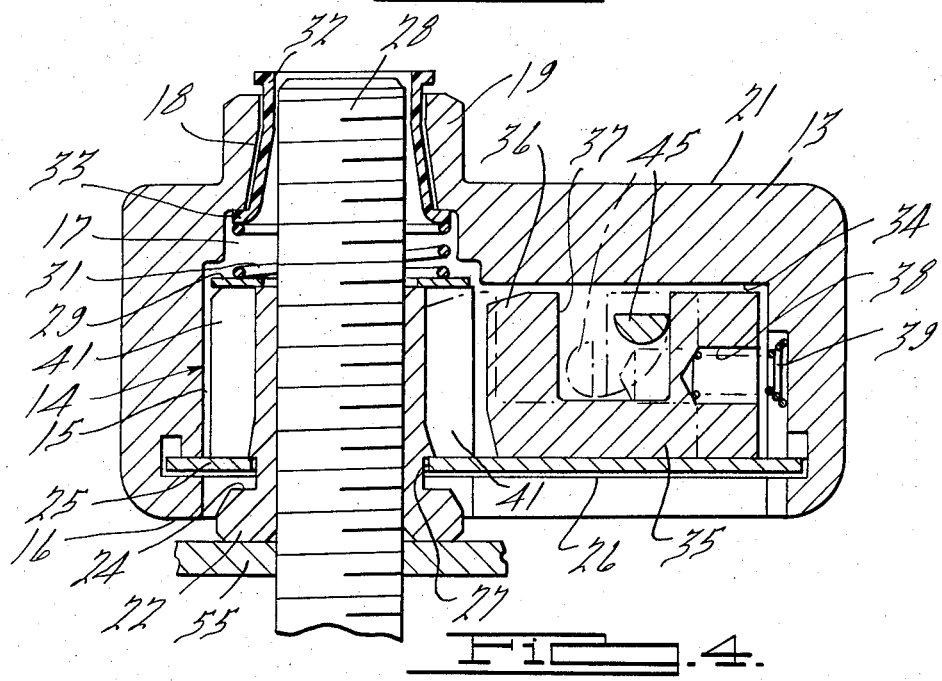
FIG. 4 is a sectional view on the line 4—4 of FIG. 1.
Figure 5:
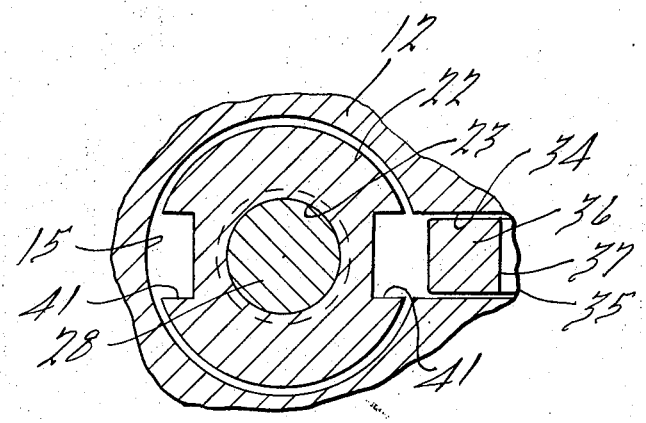
FIG. 5 is a sectional view on the line 5—5 of FIG. 3.

The nut member 22 is permitted a slight degree of axial float within the chamber section 15 to make it easier to thread onto a hold-down bolt as represented by the threaded bolt portion 28 in FIG. 4. At its upper end the nut member is capped by a washer 29, a compression spring 31 and an elastomeric anti-rattle bushing 32, the bushing being retained in the smaller or upper section 18 of the cylindrical stepped chamber 14 by a flange 33.

The housing 12 has a substantially rectangular longitudinally extending chamber 34 having lateral communication with the cylindrical chamber section 15 and the elongated plate receiving slot 26. In effect, the plate 25 when in place provides a closure for the chamber 34 and a surface on which a slide bolt means 35 is movable.

The slide bolt means 35 comprises an elongated bolt having a tapered nose portion 36, a centrally positioned notch 37 and a recess 38 receiving a compression spring 39.

The slide bolt means 35 is slidable from its solid outline position in FIG. 4 to the dotted outline position in which it is adapted to engage in either one of two diametrically opposite axially extending notches 41 in the nut member 22, for a purpose to be explained.

The slide bolt means 35 is movable by a conventional key cylinder mechanism 42 housed in a cylindrical extension 43 projecting from the side face 44 of the housing 12. The eccentric extension 45 of the barrel 46 of the key cylinder mechanism engages the wall of the notch 37 in the slide bolt means 35. It will be understood that the slide bolt means 35 is spring urged (spring 39) toward the nut member 22 and the key cylinder mechanism 42 is operable by the key 47 to retract the slide bolt means 35 against the force of the spring 39.

An important feature of the present invention is the provision of reinforcing ribs on the exterior of the housing 12 in protective relationship to the chamber 14 in which the nut 22 is housed. The ribs include a central horizontal rib 48 extending from the cylindrical extension 43 housing the key cylinder mechanism 42. The rib 43 is angularly inclined toward the left end of the body portion 13 as best seen in FIG. 1. On the key cylinder mechanism side of the lock assembly, which may be called the front side, vertical ribs 49 and 51 taper downwardly and upwardly, respectively, from the horizontal rib 48. On the rear side dual vertical ribs 52 taper downwardly and upwardly from a horizontal centrally positioned semi-circular rib 53.

Before explaining the function of the ribs, an additional other structural feature will be described. It is desirable that there be a predetermined frictional drag between the nut member 22 internal threads 23 and the threads of the hold-down bolt 28 so that when the nut member 22 is freely rotatable relative to the housing 12, it cannot be removed from the hold-down bolt 28 by finger manipulation. This frictional relationship may be achieved by placing the nut member 22, during the manufacturing process, under enough pressure to deflect the threaded hole into a slightly oval configuration at its midpoint.

Rotation of the housing is facilitated by projecting handles 54, although if desired a wrench may be applied to the nut-shaped appendage 19 at the top of the housing 12.

OPERATION

The application of the spare wheel lock assembly 11 to the tire hold-down bolt 28 is the same as the application of a conventional wing nut. In a conventional installation the hold-down bolt is secured to a luggage compartment floor or side panel and projects through the hub aperture of the spare wheel. It also projects through a hold-down plate, represented at 55 in FIG. 4, which usually is the jack base.

In order to thread the nut member 22 on the hold-down bolt 28, it is necessary to place the spare wheel lock assembly in unlocked condition. This means turning the key cylinder mechanism 42 to a position in which the eccentric 45 on the lock cylinder barrel 46 is moved to the dot and dash outline position in FIG. 4 so that the spring 49 can drive the bolt means nose portion into engagement with the nut member 22. If the nose portion 36 is not in alignment with a notch 41, rotation of the nut member 22, as will occur when it is attempted to thread the latter onto the bolt 28, will bring a notch 41 into alignment with the nose portion 36 and allow the latter to move into rotation blocking position. In this condition the lock assembly is considered in unlocked condition because bodily rotation of the housing permits the nut to be threaded onto the hold-down bolt 28.

When the lock assembly 11 has been threaded on the hold-down bolt 28 as far as it will go, manipulation of the key 47 to retract the lock bolt means 35 from engagement with the nut member 22 places the assembly in unlocked or free wheeling condition. That is, the housing 12 will be spinable about the axis of the hold-down bolt 28 but will not cause any unthreading rotation of the nut member 22.

A tire thief attempting to steal a spare wheel held down by the lock assembly 11 will need more than a lug wrench. One technique would be to use a vise grip tool to apply pressure on the housing to crush the latter and jam the nut member 22. The exterior reinforcing ribs 49-51-51-53 make it extremely difficult to fit the vise grip on the housing. Any attempt to apply pressure to the vise grip causes the jaws of the latter to slip off the inclined surfaces of the ribs.

Another technique would be the use of a slam puller to yank the lock assembly off the hold-down bolt. The reinforcing plate 25 distributes the impact force to the housing 12 and resists the separation of the housing from the nut member 22 contained therein.

And yet another technique for removing the lock assembly 11 would be to deflate the tire thus providing enough room to reach the nut 22 with the fingers or a small tool. It will be found, however, that the interference fit between the nut member 22 threads and the hold-down bolt 28 threads built into the lock assembly is such that insufficient turning force can be finger or small tool applied to turn the nut off the bolt.

Only by release of the bolt member 22 by operation of the key cylinder mechanism 42 can the lock assembly be removed.

It is to be understood that the invention is not limited to the exact construction illustrated and described above, but that various changes and modifications may be made without departing from the spirit and scope of the invention defined by the following claims:

We claim:
1. A spare wheel lock assembly for preventing removal of a wheel from a hold-down bolt,
    the lock assembly comprising a housing,
    nut means rotatably mounted within the housing for threaded engagement with a hold-down bolt,
    reinforcing plate means carried by the housing in engagement with the nut to retain the latter in the housing and to prevent forceable displacement of the housing relative to the nut when the latter is threaded on the hold-down bolt,
    key operable bolt means slidable within the housing for locking the nut means to the housing whereby a predetermined twisting force applied to the housing about the axis of the hold-down bolt will rotate and unthread the nut from the bolt,
    and reinforcing rib means on the housing positioned to resist a tool applied force to the housing for crushing the latter and jamming the bolt therein.
2. A spare wheel lock assembly according to claim 1, in which:
    the nut means has a substantially cylindrical body portion,
    and the reinforcing plate means is a plate member having radial engagement with a peripheral groove in the nut body portion.

3. A spare wheel lock assembly according to claim 2, in which:

the bolt means comprises a bolt member slidable radially of the nut body portion, the nut body portion having a bolt receiving notch therein.

4. A spare wheel lock assembly according to claim 3, in which:

the bolt means includes a spring interposed between the bolt member and housing urging the bolt means radially toward the nut means, and a key cylinder means carried by the housing is operable to retract the bolt means from the nut means and holds the bolt means out of engagement with the nut means.

5. A spare wheel lock assembly according to claim 4, in which:

the reinforcing ribs on the housing are angularly positioned around a chamber in which the nut means is rotatably positioned.

6. A spare wheel lock assembly according to claim 1, in which:

the reinforcing ribs on the housing are angularly positioned around a chamber in which the nut means is rotatably positioned.

7. A spare wheel lock assembly according to claim 1, in which:

an elastomeric bushing member is interposed between the housing and the hold-down bolt to provide anti-rattle protection between the bolt and housing.

8. A spare wheel lock assembly according to claim 1, in which:

a friction means between the bolt and nut threads holds the nut against being unthreaded from the bolt other than by application of turning manipulation of the housing.

9. A spare wheel lock assembly adapted to prevent removal of a wheel from a hold-down bolt, the lock assembly comprising a housing having a cylindrical chamber at one end thereof with the chamber being open at both ends, a nut member projecting axially into the chamber from one end of the latter and being rotatable therein, the housing having an elongated slot therein in which an elongated plate is positioned, the plate lying in a plane normal to the axis of rotation of the nut means and having a portion thereof seated in a peripheral groove in the nut means to retain the latter in the housing and to prevent forceable axial displacement of the housing relative to the nut means when the latter is threaded on the hold-down bolt, the housing having a substantially rectangular chamber in lateral communication with the cylindrical chamber and the elongated plate receiving slot, bolt means slidable in the rectangular chamber on the plate into engagement with the nut to lock the same to the housing whereby turning movement of the housing about the axis of the hold-down bolt will unthread the nut from the bolt, key cylinder means carried in a third chamber in the housing and engaged with the bolt means for sliding the latter into and out of locking engagement with the nut means, and reinforcing rib means on the exterior of the housing in protective relationship to the nut receiving chamber, the rib means being positioned to resist the application of pressure by a tool for crushing the housing and jamming the nut therein.

10. A spare wheel lock assembly according to claim 9, in which:

the bolt means includes a spring interposed between a slidable bolt member and an end wall of the rectangular chamber, the spring urging the bolt member toward the nut means, and the key cylinder means is operable to retract the bolt means from the nut means and hold the latter out of engagement with the nut means against the spring.

* * * * *